US012484977B2

(12) United States Patent
Brisson et al.

(10) Patent No.: US 12,484,977 B2
(45) Date of Patent: Dec. 2, 2025

(54) SYSTEMS AND METHODS OF CONTROLLING INSTRUMENTS

(71) Applicant: INTUITIVE SURGICAL OPERATIONS, INC., Sunnyvale, CA (US)

(72) Inventors: Gabriel F. Brisson, Livermore, CA (US); J. Scot Hart, San Carlos, CA (US); Brian D. Soe, Oakland, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 547 days.

(21) Appl. No.: 17/914,744

(22) PCT Filed: Mar. 25, 2021

(86) PCT No.: PCT/US2021/024066
§ 371 (c)(1),
(2) Date: Sep. 26, 2022

(87) PCT Pub. No.: WO2021/195323
PCT Pub. Date: Sep. 30, 2021

(65) Prior Publication Data
US 2023/0123065 A1    Apr. 20, 2023

Related U.S. Application Data

(60) Provisional application No. 63/001,046, filed on Mar. 27, 2020.

(51) Int. Cl.
*A61B 34/30* (2016.01)
*A61B 90/00* (2016.01)

(52) U.S. Cl.
CPC .............. *A61B 34/30* (2016.02); *A61B 90/06* (2016.02); *A61B 2034/305* (2016.02); *A61B 2090/064* (2016.02)

(58) Field of Classification Search
CPC ... A61B 34/30; A61B 2034/305; A61B 17/29; A61B 2090/064; G05B 2219/39237
See application file for complete search history.

(56) References Cited

U.S. PATENT DOCUMENTS 8,644,988 B2    2/2014  Prisco et al.
8,821,480 B2    9/2014  Burbank
(Continued)

FOREIGN PATENT DOCUMENTS

CN    109839826 A    6/2019
CN    110421547 A    11/2019
(Continued)

OTHER PUBLICATIONS

International Search Report and Written Opinion for Application No. PCT/US2021/024066, mailed Jun. 14, 2021, 20 pages.
(Continued)

*Primary Examiner* — Carl H Layno
*Assistant Examiner* — Bryan Mcallister Lee
(74) *Attorney, Agent, or Firm* — Artegis Law Group, LLP

(57) ABSTRACT

Systems and methods of controlling instruments include first and second actuators configured to actuate a degree of freedom (DOF) in first and second directions using respective transmission mechanisms and a control unit. The control unit is configured to determine positions of the first and second actuators; determine an actuation command based on the positions of the first and second actuators, and a desired state of the DOF; determine respective actuation levels of the first and second actuators so as to maintain tensions in the transmission mechanisms above respective minimum tensions by: using a model based on the force or torque command, the minimum tensions, and the first and second actuator positions; and command actuation of the first and second actuators at the respective actuation levels. The
(Continued)

model compensates for an external disturbance on the DOF and for dynamics of the first and second actuators.

21 Claims, 6 Drawing Sheets

(56) References Cited

U.S. PATENT DOCUMENTS

| | | |
|---|---|---|
| 9,101,379 B2 | 8/2015 | Au et al. |
| 9,743,990 B2 | 8/2017 | Au et al. |
| 10,493,239 B2 * | 12/2019 | Hart .................. A61B 90/03 |
| 2014/0276933 A1 | 9/2014 | Hart et al. |
| 2017/0127911 A1 | 5/2017 | Yamamoto et al. |
| 2018/0228563 A1 | 8/2018 | Smaby et al. |
| 2019/0015175 A1 | 1/2019 | Tamura et al. |

FOREIGN PATENT DOCUMENTS

| | | |
|---|---|---|
| EP | 2786721 A2 | 10/2014 |
| WO | WO-2015142290 A1 | 9/2015 |
| WO | WO-2016187008 A1 | 11/2016 |
| WO | WO-2019032058 A1 | 2/2019 |
| WO | WO-2019094099 A1 | 5/2019 |
| WO | WO-2019164856 A1 | 8/2019 |
| WO | WO-2019221754 A1 | 11/2019 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

SYSTEMS AND METHODS OF CONTROLLING INSTRUMENTS

CROSS-REFERENCE TO RELATED APPLICATIONS

The present application is a U.S. National Stage patent application of International Patent Application No. PCT/US2021/024066, filed Mar. 25, 2021, the benefit of which is claimed, and claims priority to U.S. Provisional Patent Application No. 63/001,046, filed Mar. 27, 2020, and titled "Systems and Methods of Controlling Instruments," each of which are hereby incorporated by reference.

TECHNICAL FIELD

The present disclosure relates generally to operation of devices with instruments and more particularly to controlling at least one degree of freedom of the instruments.

BACKGROUND

More and more devices are being replaced with computer-assisted electronic devices. This is especially true in industrial, entertainment, educational, and other settings. As a medical example, the hospitals of today with large arrays of electronic devices being found in operating rooms, interventional suites, intensive care wards, emergency rooms, and/or the like. For example, glass and mercury thermometers are being replaced with electronic thermometers, intravenous drip lines now include electronic monitors and flow regulators, and traditional hand-held surgical and other medical instruments are being replaced by computer-assisted medical devices.

These computer-assisted devices are useful for performing operations and/or procedures on materials, such as the bodily tissue of a patient, that are located in a workspace. With many computer-assisted devices, an operator (such as surgeon in a medical example) may remotely teleoperate a computer-assisted device using one or more controls on an operator console. As the operator manipulates the various controls at the operator console, the commands are relayed from the operator console to a device, in or near the workspace, to which one or more end effectors and/or instruments are mounted. In this way, the operator is able to perform one or more procedures on a material or object in the workspace using the end effectors and/or instruments. Depending upon the desired procedure and/or the instruments in use, the desired procedure may be performed partially or wholly under control of the operator using teleoperation and/or under semi-autonomous control where the instrument may perform or alter a sequence of operations based on one or more activation actions by the operator.

Instruments of different design and/or configuration may be used to perform different tasks, procedures, and/or functions so as to be allow the operator to perform any of a variety of procedures. Computer-assisted instruments, whether actuated manually, teleoperatively, and/or semi-autonomously, may be used in a variety of operations and/or procedures and may have various configurations. Many such instruments include an end effector mounted at a distal end of a shaft that may be mounted to the distal end of a repositionable arm. In many operational scenarios, the shaft may be configured to be inserted (e.g., laparoscopically, thoracoscopically, and/or the like) through an opening (e.g., a body wall incision, a natural orifice, an access port, and/or the like) to reach a remote site within the workspace. In some instruments, an articulated wrist mechanism may be mounted to the distal end of the instrument's shaft to support the end effector with the articulated wrist providing the ability to alter an orientation of the end effector relative to a longitudinal axis of the shaft. Examples of such instruments include, but are not limited to, cauterizing, ablating, suturing, cutting, stapling, fusing, sealing, etc., and/or combinations thereof. Accordingly, instruments can include a variety of components and/or combinations of components to perform these procedures.

When access to the workspace is limited, the size and/or strength of the instruments may be limited. As a medical example, when the computer-assisted device is being used to perform a minimally invasive surgical procedure, the instruments may have to fit through a bodily orifice and/or a body wall incision that is kept as small as possible to reduce the impact on the patient. In another example, when the workspace is contained (e.g., it is hazardous, climate controlled, sterile, and/or the like), access to the workspace may be controlled through one or more orifices that may be of reduced size. Consistent with the goals of accessing a workspace having limited access, the size of the end effector is typically kept as small as possible while still allowing it to perform its intended task. One approach to keeping the size of the end effector small is to accomplish actuation of the end effector through the use of one or more inputs at a proximal end of the instrument, which may be located externally to the workspace. Various gears, levers, pulleys, cables, rods, bands, chains, chains, sprockets, and/or the like, may then be used to transmit actions from the one or more inputs along the shaft of the instrument and to actuate a degree of freedom (DOF) of the end effector. For example, a force or torque transmission mechanism at the proximal end of the instrument interfaces with various actuators, such as motors, solenoids, servos, hydraulics, pneumatics, and/or the like provided via a drive unit on a repositionable arm of the computer-assisted device located in or near the workspace. The actuators typically receive control signals from a control module and provide input in the form of force and/or torque at the proximal end of the force or torque transmission mechanism, which the various gears, levers, pulleys, cables, rods, bands, chains, sprockets, and/or the like ultimately transmit to actuate the DOF of the end effector at the distal end of the force or torque transmission mechanism.

When the force or torque transmission mechanism is sufficiently rigid so that it can apply force or torque in both directions to the DOF, a single actuator in the drive unit may be used to actuate the DOF in both directions. However, in this case the force or torque transmission mechanism is typically larger than desired and/or larger than may be accommodated by the body wall incision, natural orifice, access port, and/or the like.

Accordingly, improved methods and systems for controlling instruments using remotely located actuators are desirable.

SUMMARY

Consistent with some embodiments, a computer-assisted device includes a first actuator configured to actuate a degree of freedom of an instrument in a first direction using a first force or torque transmission mechanism, a second actuator configured to actuate the degree of freedom in a second direction using a second force or torque transmission mechanism, and a control unit coupled to the first actuator and the second actuator. The second direction is at least partially opposite to the first direction. The control unit is configured to determine a first position of the first actuator; determine a second position of the second actuator; determine a force or torque command based on the first position, the second position, and a desired state of the degree of freedom; determine a first actuation level of the first actuator and a second actuation level of the second actuator so as to maintain a first tension in the first force or torque transmission mechanism above a first minimum tension and maintain a second tension in the second force or torque transmission mechanism above a second minimum tension by: using a model based on the force or torque command, the first and second minimum tensions, the first position, and the second position; and command actuation of the first actuator at the first actuation level and actuation of the second actuator at the second actuation level. The model compensates for an external disturbance on the degree of freedom and for dynamics of the first actuator and the second actuator.

Consistent with some embodiments, a method performed by a control unit of a computer-assisted device includes determining a first position of a first actuator configured to actuate a degree of freedom of an instrument in a first direction using a first force or torque transmission mechanism; determining a second position of a second actuator configured to actuate the degree of freedom in a second direction using a second force or torque transmission mechanism; determining a force or torque command based on the first position, the second position, and a desired state of the degree of freedom; determining a first actuation level of the first actuator and a second actuation level of the second actuator so as to maintain a first tension in the first force or torque transmission mechanism above a first minimum tension and maintain a second tension in the second force or torque transmission mechanism above a second minimum tension by: using a model based on the force or torque command, the first and second minimum tensions, the first position, and the second position; and commanding actuation of the first actuator at the first actuation level and actuation of the second actuator at the second actuation level. The second direction is at least partially opposite to the first direction. The model compensates for an external disturbance on the degree of freedom and for dynamics of the first actuator and the second actuator.

Consistent with some embodiments, a non-transitory machine-readable medium comprising a plurality of machine-readable instructions which when executed by one or more processors associated with a computer-assisted medical device are adapted to cause the one or more processors to perform any of the methods described herein.

Figure 1:
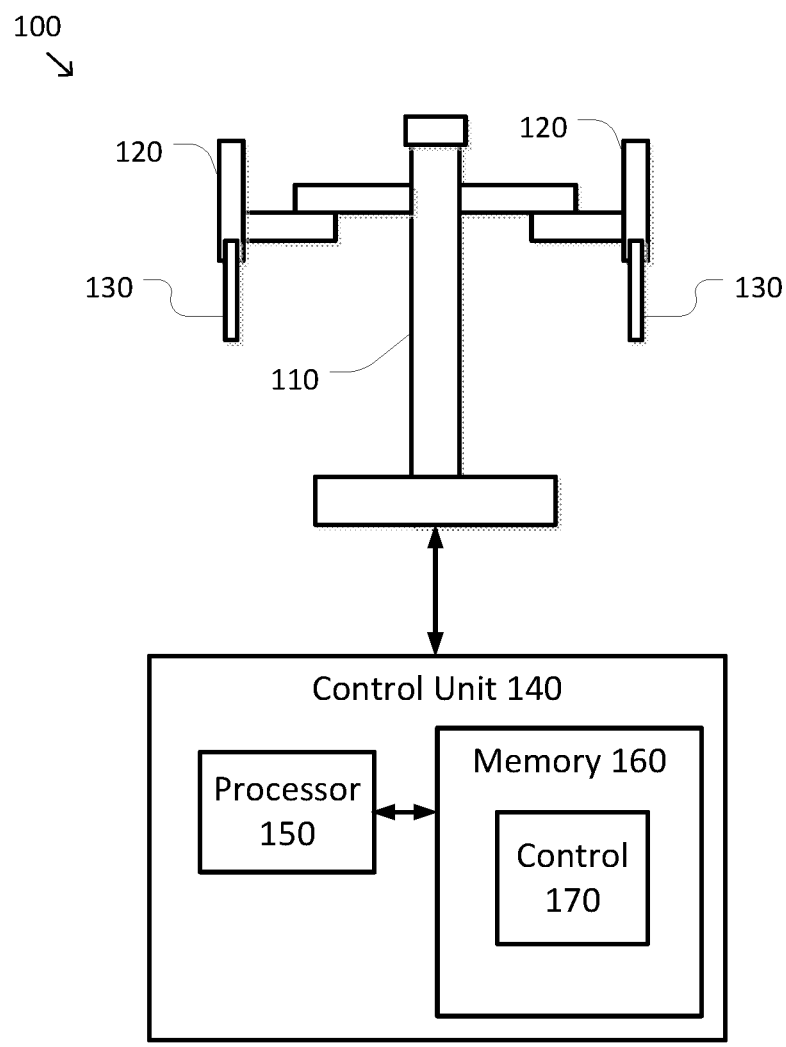
FIG. 1 is a simplified diagram of a computer-assisted system according to some embodiments.

In the figures, elements having the same designations have the same or similar functions.

DETAILED DESCRIPTION

This description and the accompanying drawings that illustrate inventive aspects, embodiments, implementations, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, this description's terminology is not intended to limit the invention. For example, spatially relative terms-such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, implementation, or module may, whenever practical, be included in other embodiments, implementations, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

In some instances, well known methods, procedures, components, and circuits have not been described in detail so as not to unnecessarily obscure aspects of the embodiments.

This disclosure describes various devices, elements, and portions of computer-assisted devices and elements in terms of their state in three-dimensional space. As used herein, the term "position" refers to the location of an element or a portion of an element in a three-dimensional space (e.g., three degrees of translational freedom along Cartesian x-, y-, and z-coordinates). As used herein, the term "orientation" refers to the rotational placement of an element or a portion of an element (three degrees of rotational freedom—e.g., roll, pitch, and yaw). As used herein, the term "shape" refers to a set positions or orientations measured along an element. As used herein, and for a device with repositionable arms, the term "proximal" refers to a direction toward the base of the computer-assisted device along its kinematic chain and "distal" refers to a direction away from the base along the kinematic chain.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an implementation using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments and implementations. Implementations on da Vinci® Surgical Systems are merely exemplary and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

FIG. 1 is a simplified diagram of a computer-assisted system 100 according to some embodiments. As shown in FIG. 1, computer-assisted system 100 includes a computer-assisted device 110 with one or more movable or repositionable arms 120. Each of the one or more repositionable arms 120 may support one or more instruments 130. In some examples, computer-assisted device 110 may be consistent with a computer-assisted surgical device. The one or more repositionable arms 120 may each provide support for instruments 130 such as surgical instruments, imaging devices, and/or the like. In some examples, the instruments 130 may include end effectors that are capable of, but are not limited to, performing, gripping, retracting, cauterizing, ablating, suturing, cutting, stapling, fusing, sealing, etc., and/or combinations thereof.

Computer-assisted device 110 may further be coupled to an operator workstation (not shown), which may include one or more input controls for operating the computer-assisted device 110, the one or more repositionable arms 120, and/or the instruments 130. In some examples, the one or more input controls may include master manipulators, levers, pedals, switches, keys, knobs, triggers, and/or the like. In some embodiments, computer-assisted device 110 and the operator workstation may correspond to a da Vinci® Surgical System commercialized by Intuitive Surgical, Inc. of Sunnyvale, Calif. In some embodiments, computer-assisted surgical devices with other configurations, fewer or more repositionable arms, and/or the like may be used with computer-assisted system 100.

Computer-assisted device 110 is coupled to a control unit 140 via an interface. The interface may include one or more cables, fibers, connectors, and/or buses and may further include one or more networks with one or more network switching and/or routing devices. Control unit 140 includes a processor 150 coupled to memory 160. Operation of control unit 140 is controlled by processor 150. And although control unit 140 is shown with only one processor 150, it is understood that processor 150 may be representative of one or more central processing units, multi-core processors, microprocessors, microcontrollers, digital signal processors, field programmable gate arrays (FPGAs), graphics processing units (GPUs), application specific integrated circuits (ASICs), tensor processing units (TPUs), and/or the like in control unit 140. Control unit 140 may be implemented as a stand-alone subsystem and/or board added to a computing device or as a virtual machine. In some embodiments, control unit 140 may be included as part of the operator workstation and/or operated separately from, but in coordination with the operator workstation.

Memory 160 may be used to store software executed by control unit 140 and/or one or more data structures used during operation of control unit 140. Memory 160 may include one or more types of machine-readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown in FIG. 1, memory 160 includes a control module 170 that may be used to support autonomous, semiautonomous, and/or teleoperated control of computer-assisted device 110. Control module 170 may include one or more application programming interfaces (APIs) for receiving position, motion, force, torque, and/or other sensor information from computer-assisted device 110, repositionable arms 120, and/or instruments 130, exchanging position, motion, force, torque, and/or collision avoidance information with other control units regarding other devices, and/or planning and/or assisting in the planning of motion for computer-assisted device 110, repositionable arms 120, and/or instruments 130. In some examples, control module 170 may further support autonomous, semiautonomous, and/or teleoperated control of the instruments 130 during a procedure, such as a surgical procedure. And although control module 170 is depicted as a software application, control module 170 may be implemented using hardware, software, and/or a combination of hardware and software.

In some medical embodiments, computer-assisted system 100 may be found in an operating room and/or an interventional suite. And although computer-assisted system 100 includes only one computer-assisted device 110 with two repositionable arms 120 and corresponding instruments 130, it is understood that computer-assisted system 100 may include any number of computer-assisted devices with repositionable arms and/or instruments of similar and/or different in design from computer-assisted device 110. In some examples, each of the computer-assisted devices may include fewer or more repositionable arms and/or instruments.

Figure 2:
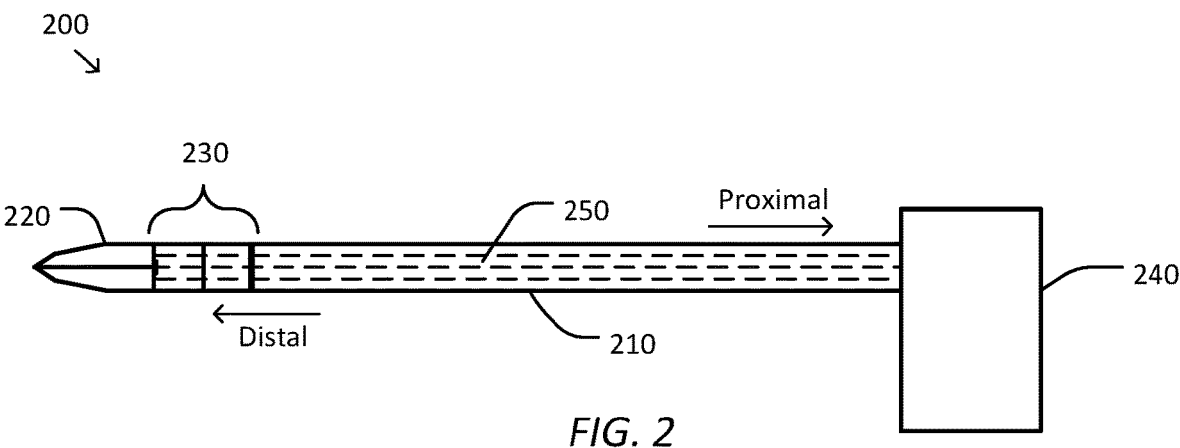
FIG. 2 is a simplified diagram of an instrument according to some embodiments.

FIG. 2 is a simplified diagram of an instrument 200 according to some embodiments. In some embodiments, instrument 200 may be consistent with any of the instruments 130 of FIG. 1. The directions "proximal" and "distal" as depicted in FIG. 2 and as used herein help describe the relative orientation and location of components of instrument 200. Distal generally refers to elements in a direction further along a kinematic chain from a base of a computer-assisted device, such as computer-assisted device 110, and/or or closer to the workspace in the intended operational use of the instrument 200. Proximal generally refers to elements in a direction closer along a kinematic chain toward the base of the computer-assisted device and/or one of the repositionable arms of the computer-assisted device.

As shown in FIG. 2, instrument 200 includes a shaft 210 used to couple an end effector 220 located at a distal end of shaft 210 to where the instrument 200 is mounted to a repositionable arm and/or a computer-assisted device proximal to shaft 210. Depending upon the particular procedure for which the instrument 200 is being used, shaft 210 may be inserted through an opening (e.g., a body wall incision, a natural orifice, a workspace port, and/or the like) in order to place end effector 220 in proximity to a remote work site located within the workspace (e.g., an interior anatomy of a patient in a medical example). As further shown in FIG. 2, end effector 220 is generally consistent with a two gripper-style end effector, which in some embodiments may further include a cutting and/or a fusing or sealing mechanism. However, it is understood that different instruments 200 with different end effectors 220 are possible, including one, two, or any number of fingers in various shapes and sizes, and these designs may be consistent with embodiments of instrument 200.

An instrument, such as instrument 200 with end effector 220, typically moves with motion along multiple DOFs during operation of instrument 200. Depending upon the configuration of instrument 200, and of the repositionable arm and/or computer-assisted device to which instrument 200 is mounted, various DOFs may be available to position, orient, and/or operate end effector 220. In some examples with an insertion DOF, the configuration of the system may provide the insertion DOF by enabling insertion or retraction of shaft 210 along an insertion axis relative to the a proximal portion of instrument 200; in some other examples with insertion DOFs, the insertion DOF may be provided by enabling translation of the entire instrument 200 along an insertion axis. In some examples with roll DOFs, the configuration of the system may provide a roll DOF for the end effector 220 by enabling rotation of shaft 210 about a longitudinal axis relative to a proximal portion of instrument 200; in some other examples with roll DOFs, the roll DOF may be provided by enabling rotation of the entire instrument 200 about a longitudinal axis. In some examples, the instrument 200 comprises an articulated wrist 230 coupled between end effector 220 and shaft 210. Such an articulated wrist 230 may include one or more joints, such as one or more rotational, prismatic, ball, or complex joints that provide one or more "pitch," "yaw," or individual finger control (such as for opening or closing jawed instruments) DOFs. Such wrist supported DOFs may be used to control a position or orientation of end effector 220 relative to the longitudinal axis of shaft 210. In some examples, instrument 200 may further include a grip DOF specifically used to control the opening and closing of jaws of end effector 220, an activation DOF used to control the extension, retraction, and/or operation of a cutting mechanism, or other DOFs.

Instrument 200 further includes a drive system 240 located at the proximal end of shaft 210. Drive system 240 includes one or more components for introducing forces and/or torques to instrument 200 that may be used to manipulate the various DOFs supported by instrument 200. In some examples, drive system 240 may include one or more actuators and be operated based on signals received from a control unit, such as control unit 140 of FIG. 1. Examples of actuators include motors and solenoids powered by any appropriate power source, including electricity, hydraulics, pneumatics, and/or the like. In some examples, the signals may include one or more currents, voltages, pulse-width modulated wave forms, and/or the like. In some examples, drive system 240 may include no actuators and instead include one or more transmission components, and be removably coupled to corresponding actuators that are part of the repositionable arm, such as any of the repositionable arms 120; such a drive system 240 may transmit and/or transform forces and/or torques from those actuators to apply those forces and/or torques and adjust the various DOFs of instrument 200. In some examples, the drive system 240 includes a combination of one or more actuator and one or more transmission components removably coupled to actuators outside of the drive system 240. Example transmission components include shafts, gears, screws, pulleys, rods, bands, chains, sprockets, cables, and/or the like.

In some embodiments, the forces and/or torques generated by and/or received by drive system 240 may be transferred from drive system 240 to the various joints and/or elements of instrument 200 located distal to drive system 240 using one or more force or torque transmission mechanisms 250. In some examples, the one or more force or torque transmission mechanisms 250 may include one or more transmission components. In some examples, shaft 210 may include one or more lumens and the one or more force or torque transmission mechanisms 250 pass along the inside of shaft 210 inside the one or more lumens from drive system 240 to the corresponding DOF in end effector 220 and/or articulated wrist 230.

In some embodiments, a DOF of instrument 200 is controlled using a single actuator and a single force or torque transmission path between the actuator and the DOF. To support actuation of the DOF in two directions (e.g., clockwise and counterclockwise, insertion and retraction, translation to the left and right, and/or the like) the force or torque transmission mechanisms in that transmission path between the actuators and DOF is able to apply force or torque in both directions to the DOF. Examples of such a force or torque transmission mechanism include rods and a series of gears.

In some embodiments, the force or torque transmission mechanisms reliably transmit force or torque in only one manner (for example, many cables and belts can transmit tension but not compression and can be used to provide pulling but not pushing forces). Such force or torque transmission mechanisms may be favored for various reasons in a particular application, such as for smaller size, lower cost, easier assembly, greater material availability, etc.

In some of those embodiments using force or torque transmission mechanisms that reliably transmit force or torque in only one manner, the design of the transmission system itself can be adapted to use a single actuator. For example, the transmission system may configure the force or torque transmission mechanism such that actuation of the actuator always supplies the force or torque in a manner transmissible by the transmission mechanism. As a specific example, an actuator applies pulling forces to a cable both when the actuator rotates the driven pulley clockwise or counterclockwise, when the cable is configured in a loop around an undriven pulley on one side and a pulley rotated by the actuator on the other side. However, in such a configuration, the cable is often pre-tensioned; this pre-tension is to provide sufficient normal forces between the pulley and cable such that the friction between the cable and the pulleys are adequate to reliably transmit the force or torque. Such pre-tension increases the drive force needed from the actuators, and can lead to greater wear on the actuator, and on the cables, pulleys, and other parts of the transmission system. Further, such pre-tensioning may limit the material options for the transmission system, such as in some cases leading to avoidance of certain plastic and/or composite materials, such as in some cases certain ultra-high molecular weight polyethylene (UHMWPE or UHMW), or high-modulus polyethylene (HMPE).

In some other embodiments using force or torque transmission mechanisms that reliably transmit force or torque in only one manner, the system is configured to control a DOF using two force or torque transmission paths. For example, two actuators in the drive system 240 may be used to control the DOF in antagonistic fashion, so that one actuator is configured to actuate the DOF in a first direction and the second actuator is configured to actuate the DOF in a second direction at least partially opposite the first direction. As a specific example, in an embodiment, a first cable is coupled to transmit force from a first actuator to pull the DOF in the first direction, while a second cable is coupled to transmit force from a second actuator to pull the DOF in the second direction; coordinated control of the two cables then supports control of the DOF in both the first and second directions.

Figure 3:
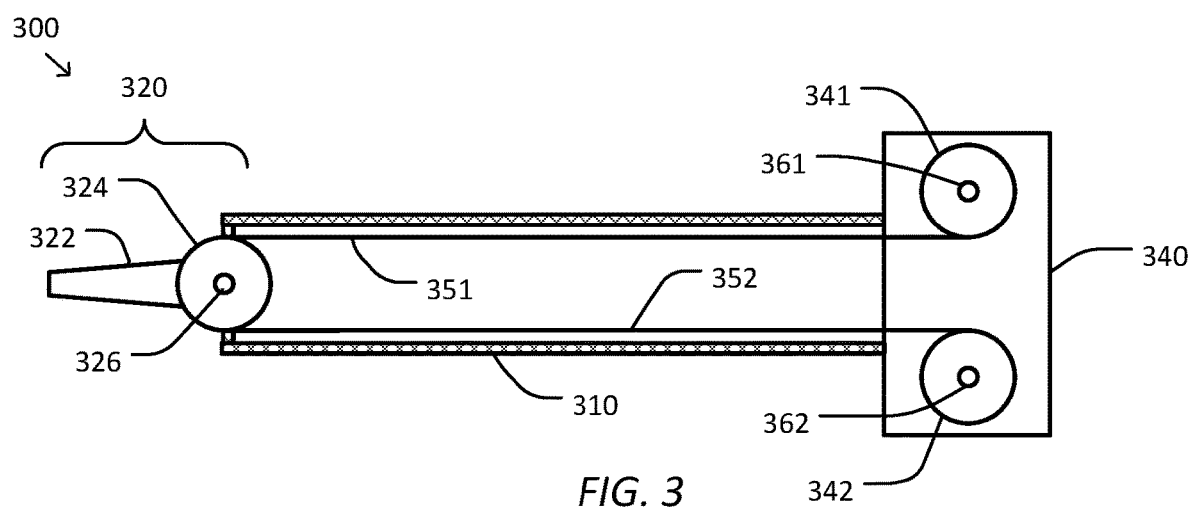
FIG. 3 is a simplified diagram of an instrument according to some embodiments.

FIG. 3 is a simplified diagram of an instrument 300 according to some embodiments. In some embodiments, instrument 300 is consistent with instrument 200. As shown in FIG. 3, instrument 300 has a first DOF controlled using first and second actuators. Although instrument 300 is shown with only one DOF in FIG. 3, it is understood that instrument 300 may include one, two, or more DOFs. As shown in FIG. 3, instrument 300 includes a shaft 310 coupling an end effector 320 to a drive unit 340. End effector 320 includes a finger 322 attached to a disc 324, such that the finger 322 rotates with the disc 324. The disc 324 may be rotated about an axis 326, thus providing the finger 322 with a rotary degree of freedom. The disc 324 is rotated by controlling a first force or torque transmission mechanism 351 and/or a second force or torque transmission mechanism 352. First force or torque transmission mechanism 351 couples disc 324 to a first actuator 341 for driving the disc 324 in a first rotary direction. Second force or torque transmission mechanism 352 couples disc 324 to a second actuator 342 for driving the disc 324 in a second rotary direction opposite the first rotary direction. For convenience of explanation, in the example of FIG. 3, first and second actuators 341, 342 are shown as within the drive unit 340. However, and as discussed above, first and second actuators 341, 342 may be located outside of the instrument, and coupled to the drive unit 340 using any number of force or torque transmission components.

The first and second actuators 341, 342 are both in drive unit 340, and each of the first and second actuators 341, 342 may include a drivetrain for transmitting the motive force provided by the actuators to the force or torque transmission mechanisms 351, 352. As shown, first actuator 341 provides rotary motive force about a first axis 361, and second actuator 342 provides rotary motive force about a second axis 362. Finger 322 may be rotated clockwise by pulling on force or torque transmission mechanism 351 while moving, facilitating movement of, or allowing movement of, force or torque transmission mechanism 352 to follow. Similarly, finger 322 may be rotated counterclockwise by pulling on force or torque transmission mechanism 352 while moving, facilitating movement of, or allowing movement of, force or torque transmission mechanism 351 to follow. Because actuators 341 and 342 typically perform work to move finger 322 in opposite directions, this arrangement is sometimes referred to as antagonistic, or antagonistic control.

Although FIG. 3 depicts first actuator 341 and second actuator 342 as rotary with a single pulley, in other embodiments, first actuator 341 and/or second actuator 342 may be linear actuators, have any number of transmission components, or both. Similarly, although FIG. 3 depicts force or torque transmission mechanisms 351 and 352 as single, monolithic components (e.g. cables, bands, etc.), in some embodiment any number of components may form each of the force or torque transmission mechanisms 351 and 352.

Figure 4:
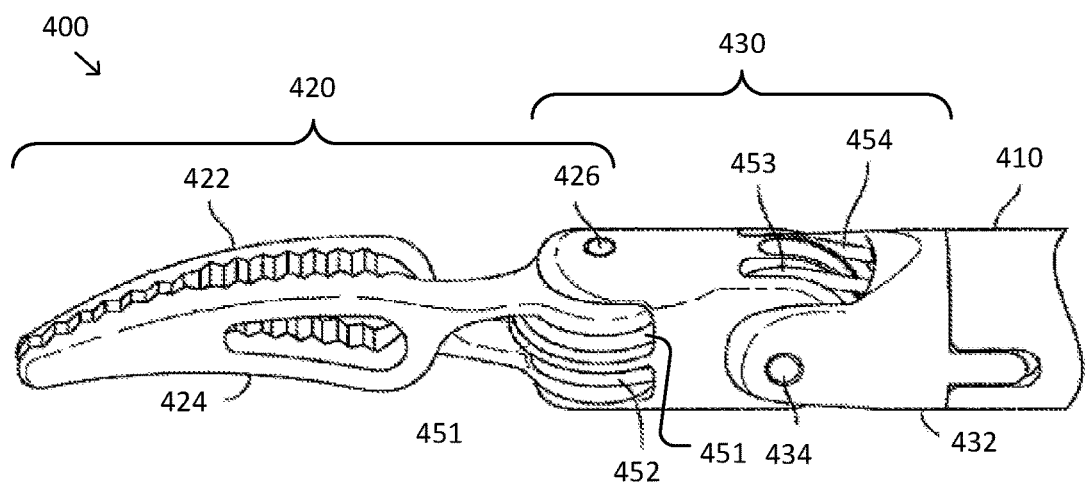
FIG. 4 is a simplified diagram of a distal end of an instrument according to some embodiments.

FIG. 4 is a simplified diagram of a distal portion of an instrument 400 according to some embodiments, showing part of a shaft, the wrist, and the end effector of the instrument 400. In some embodiments, instrument 400 is consistent with instrument 200. Instrument 400 includes an end effector 420 coupled to a shaft 410 via an articulated wrist 430. End effector 420 includes a first finger 422 (also referred to as first jaw 422) that may be rotated about an axis 426 and a second finger 424 (also referred to as second jaw 424) that may also be rotated about axis 426. In some embodiments, jaws 422 and jaws 424 are operated in a coordinated fashion to produce different behaviors. In some examples, by moving jaws 422 and 424 relative to each other, such as by moving only jaw 422, only jaw 424, or both jaws 422, 424 relative to the wrist 430, it is possible to reduce a gap between jaws 422 and 424 by rotating jaws 422 and 424 toward each other; this produces a closing motion of the jaws 422, 424, and may be used to, for example, grip a material. In some examples, by moving jaws 422 and 424 relative to each other, such as by moving only jaw 422, only jaw 424, or both jaws 422, 424 relative to the wrist 430, it is possible to increase a gap between jaws 422 and 424 by rotating jaws 422 and 424 away from each other; this produces an opening motion of the jaws 422, 424 and may be used to, for example, release a gripped material. In some examples, by rotating jaws 422, 424 in a same direction, a yaw of end effector 420 relative to the wrist 430 can be changed.

Also shown in FIG. 4 are some of the force or torque transmission mechanisms used to control the DOFs of end effector 420. For example, a first force or torque transmission mechanism 451 for controlling first jaw 421 is shown, as well as a second force or torque transmission mechanism 452 for controlling second jaw 424. Each of force or torque transmission mechanisms 451 and 452 may be coupled at a proximal portion of the instrument 400 to a drive unit, and be driven by one, two, or more actuators, such as described in conjunction with FIG. 3.

Articulated wrist 430 includes a clevis 432 and a pin 434 about which end effector 420 may be rotated relative to clevis 432 and shaft 410. As shown articulated wrist 430 provides a pitch DOF of instrument 400. The pitch DOF is articulated using force or torque transmission mechanisms 453 and 454. Each of force or torque transmission mechanisms 453 and 454 may be coupled at a proximal portion of the instrument 400 to a drive unit, and be driven by one, two, or more actuators, such as described in conjunction with FIG. 3.

In the example shown, each of the cables forming force or torque transmission mechanisms 451, 452, 453, 454 wrap around a corresponding pulley to provide the opposing force or torque transmission mechanisms to force or torque transmission mechanisms 451, 452, 453, 454. In some examples, one or more separate cables form the opposing force or torque transmission mechanisms for one or more of force or torque transmission mechanisms 451, 452, 453, 454.

Although instrument 400 is shown with three DOFs in the portion depicted in FIG. 4, (grip-ungrip, yaw, and pitch), it is understood that instrument 400 may include additional DOFs (additional yaw or pitch DOFs along shaft 410, a roll DOF, and/or the like) that may be controlled using any of the approaches described herein.

Figure 5A:
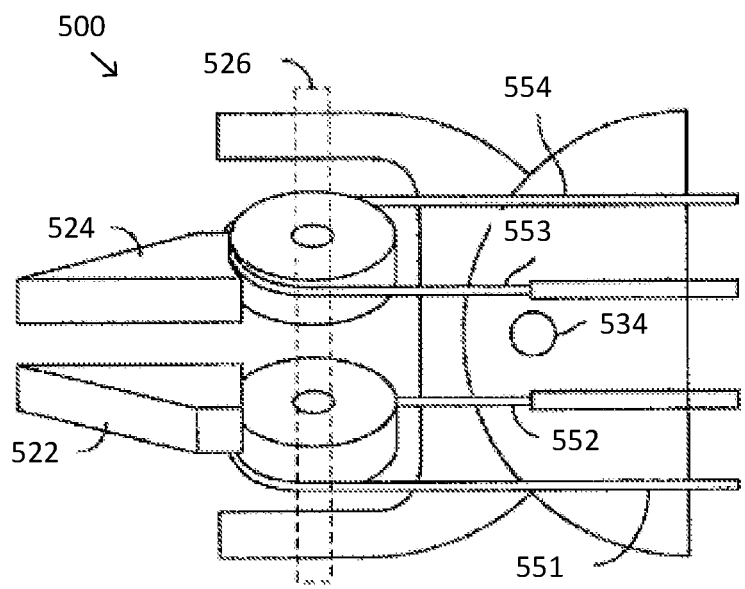
FIGS. 5A and 5B are simplified diagrams of a distal end of an instrument according to some embodiments.
Figure 5B:
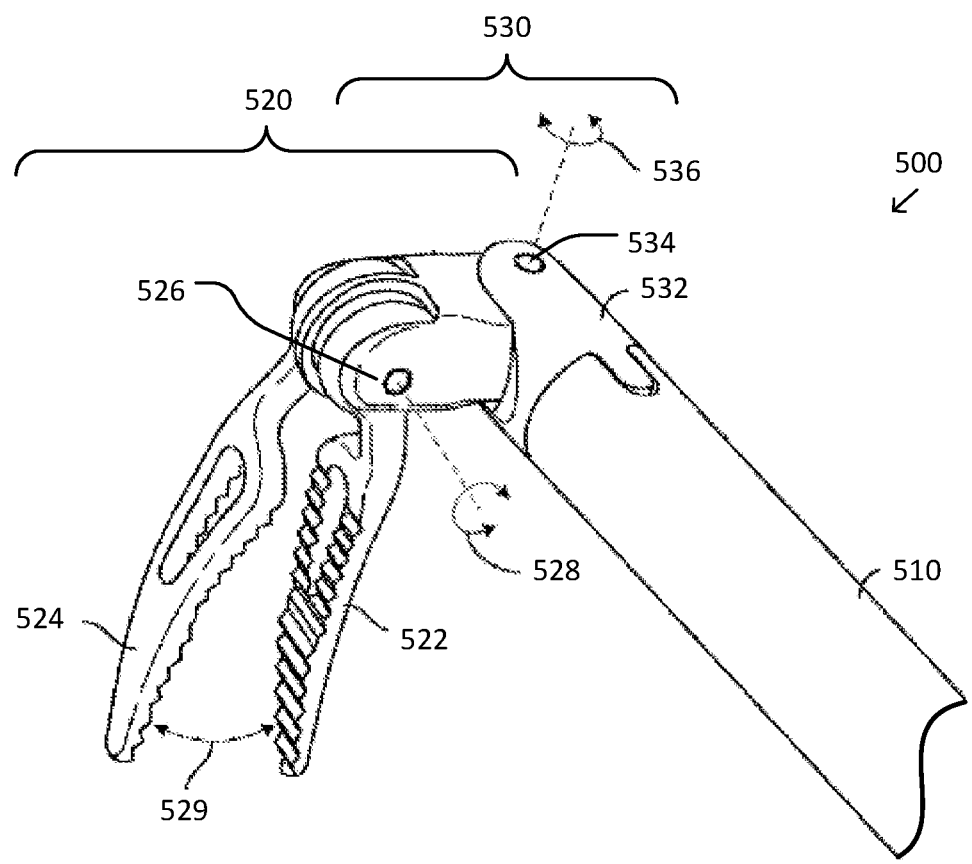

FIGS. 5A and 5B are simplified diagrams of a distal end of an instrument 500 according to some embodiments. In some embodiments, instrument 500 is consistent with instrument 200. As shown in FIGS. 5A and 5B, instrument 500 corresponds to a three DOF instrument that may be controlled using four actuators. In some embodiments, instrument 500 is consistent with instruments described in U.S. Pat. No. 8,821,480, which is incorporated by reference herein.

As shown, instrument 500 includes an end effector 520 coupled to a shaft 510 via an articulated wrist 530. End effector 520 includes a first jaw 522 that may be rotated about an axis 526 and a second jaw 524 that may also be rotated about axis 526. By moving jaws 522 and 524 relative to each other, in a fashion similar to that discussed for instrument 400, it is possible to reduce a separation 529, increase a separation 529 between jaws 522 and 524. Also, similar instrument 400, by rotating jaws in a same direction, it is possible to change a yaw of end effector 520. Articulated wrist 530 includes a clevis 532 and a pin 534 about which end effector 520 may be rotated.

The three DOFs (grip-ungrip, yaw, and pitch) shown in FIG. 5A-5B of instrument 500 are controlled using four force or torque transmission mechanisms 551-554. In some embodiments, each of force or torque transmission mechanisms 551-554 is coupled at its respective proximal end to a drive unit, such that the force or torque transmission mechanism can be driven by one or more respective actuator. In some embodiments, force or torque transmission mechanisms 551-554 may be coupled to actuators consistent to the embodiments shown for force or torque transmission mechanisms 351 and 352 of FIG. 3.

For clockwise rotation about pitch axis 536, the actuators pull on force or torque transmission mechanisms 553 and 554 while force or torque transmission mechanisms 551 and 552 are correspondingly moved, facilitated to be moved, or allowed to move to follow. Conversely, for counterclockwise rotation about pitch axis 536, the actuators pull on force or torque transmission mechanisms 551 and 552 while force or torque transmission mechanisms 553 and 554 are correspondingly moved, facilitated to be moved, or allowed to move to follow.

For clockwise rotation of jaw 522 about axis 528, the actuators pull on force or torque transmission mechanism 552 while force or torque transmission mechanism 551 is correspondingly moved, facilitated to be moved, or allowed to move to follow. Conversely, for counterclockwise rotation of jaw 522 about axis 528, the actuators pull on force or torque transmission mechanism 551 while force or torque transmission mechanism 552 is moved, facilitated to be moved, or allowed to move to follow.

Rotation of jaw 524 about axis 528 is accomplished using force or torque transmission mechanisms 553 and 554. For clockwise rotation of jaw 524 about axis 528, the actuators pull on force or torque transmission mechanism 554 while force or torque transmission mechanism 553 is moved, facilitated to be moved, or allowed to move to follow. Conversely, for counterclockwise rotation of jaw 524 about axis 528, the actuators pull on force or torque transmission mechanism 553 while force or torque transmission mechanism 554 is moved, facilitated to be moved, or allowed to move to follow.

As described above, and similar to the embodiments of FIG. 4, coordinated movement of the jaws 522, 524 toward each other, away from each other, and in the same direction provides jaw grip-ungrip and yaw DOFs.

Table I summarizes the various force or torque transmission mechanism manipulations to control the pitch, yaw, and grip-ungrip DOFs of instrument 500. "Follows" Table I is used to indicate "moved, facilitated to be moved, or allowed to move to follow." In some embodiments, combinations of pitch, yaw, and grip-ungrip may be obtained by superimposing (such as by linearly adding) the various pull and moved, facilitated to be moved, or allowed to move to follow actuation levels to obtain a desired hybrid motion of the DOFs of instrument 500. Thus, to some extent each of the actuators operate with at least some antagonism relative to each other.

TABLE I

| Desired DOF Motion | Force or Torque Transmission Mechanism | | | |
| --- | --- | --- | --- | --- |
| | 551 | 552 | 553 | 554 |
| Pitch Clockwise | Follows | Follows | Pull | Pull |
| Pitch Counterclockwise | Pull | Pull | Follows | Follows |
| Yaw Clockwise | Follows | Pull | Follows | Pull |
| Yaw Counterclockwise | Pull | Follows | Pull | Follows |
| Grip | Follows | Pull | Pull | Follows |
| Ungrip | Pull | Follows | Follows | Pull |

According to some embodiments, other configurations involve more actuators or DOFs than described above. In each of the systems with more actuators than DOFs, there exists a continuum of actuator force combinations to choose from. The control of each of the DOFs involve coordinated control of the actuators coupled to the various force or torque transmission mechanism.

For example, commonly-owned International Patent Application No. PCT/US2018/050151, which is incorporated by reference, describes several methods for selecting an actuator force combination, such as selecting the combination with a smallest magnitude that still obeys a minimum tension constraint in the force or torque transmission mechanisms. This approach is designed to reduce wear on the force or torque transmission mechanism. However, this approach does not account for inertias of the actuators and/or within the force or torque mechanisms. As a result, this approach may result in actuators moving out of sync with a desired DOF motion, causing one actuator to act on the inertia of another actuator through the compliant drive mechanisms, and/or the like. In some cases, this may lead to undesirable oscillation in the system and/or in one or more DOFs.

According to some embodiments, to implement an antagonistic control approach with fewer or less undesirable oscillations, to mitigate external disturbance forces and/or torques, and/or to account for inertias of the actuators and/or within the force or torque mechanisms, the actuation levels of the actuators may be coordinated so as to maintain at least a zero (0) tension in each of the force or torque transmission mechanisms, while avoiding application of more tension than is necessary to avoid oscillations.

Figure 6:
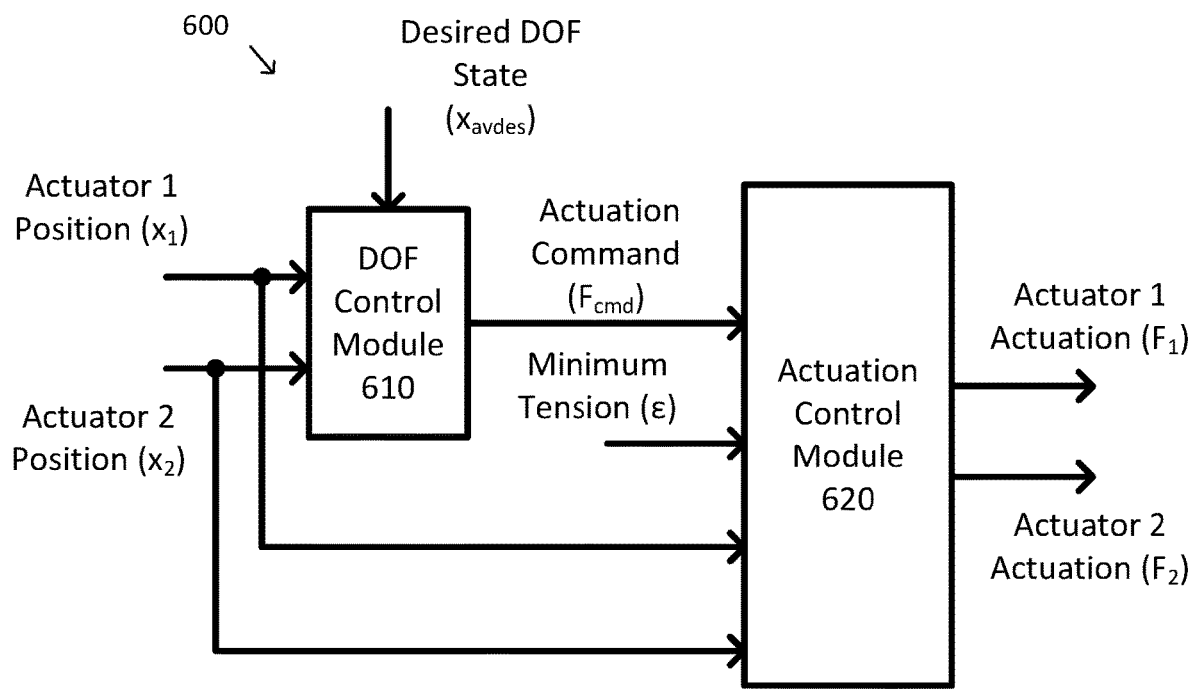
FIG. 6 is a simplified diagram of a control system for a DOF of an instrument according to some embodiments.

FIG. 6 is a simplified diagram of a control system 600 for a DOF of an instrument according to some embodiments. In some embodiments, the instrument may be consistent with any of the instruments of FIGS. 2-5B. As shown in FIG. 6, control system 600 includes a DOF control module 610 and an actuation control module 620. According to some embodiments, control system 600 is configured to control a single DOF using two actuators, such as is consistent with control of finger 322 and actuators 341 and 342 as described in the embodiments of FIG. 3.

As shown, control system 600 is configured to receive a desired DOF state ($x_{avdes}$) and a minimum tension (c) and generate actuation levels $F_1$ and $F_2$ for respective first and second actuators. In some examples, desired DOF state $x_{avdes}$ corresponds to a desired linear position, a desired rotational position, a desired linear velocity, a desired rotational velocity, and/or the like of the DOF. In some examples, desired DOF state $x_{avdes}$ may be received from another control module (not shown), such as may be used to follow a desired motion plan, a desired trajectory, and/or the like. In some examples, desired DOF state $x_{avdes}$ may be determined based on input received from one or more input controls being manipulated by an operator. In some examples, minimum tension c may correspond to a minimum tension to be maintained in the one or more force or torque transmission mechanisms coupling the DOF to the first and second actuators. In some examples, minimum tension c may be set based on one or more of operator preference, instrument calibration, a type of instrument and/or DOF being controlled, a type of procedure being performed, a type of material being manipulated using the DOF, and/or the like. In some examples, target minimum tension c may be in the range of 3 to 8 Newtons. In some examples, each of actuation levels $F_1$ and/or $F_2$ may correspond to force or a torque to be applied by the respective actuator to control the DOF.

Control system 600 further receives information about a current position $x_1$ of the first actuator and a current position $x_2$ of the second actuator. In some examples, each of positions $x_1$ and $x_2$ may correspond to a rotational and/or a linear position of the respective actuator. In some examples, each of positions $x_1$ and $x_2$ may correspond to a distance to which a respective force or torque transmission mechanism is pulled and/or follows the respective actuator. In some examples, each of positions $x_1$ and $x_2$ may be determined from one or more sensor readings, such as one or more position sensors, position encoders, and/or the like. In some examples, each of positions $x_1$ and $x_2$ may be determined using one or more kinematic models. In some examples, each of positions $x_1$ and $x_2$ may be determined from one or more images of the respective actuators and/or the respective force or torque transmission mechanisms.

DOF control module 610 receives position $x_1$ of the first actuator, position $x_2$ of the second actuator, and desired DOF state $x_{avdes}$ and determines an overall actuation command ($F_{cmd}$) for control of the DOF. In some examples, actuation command $F_{cmd}$ is determined based on errors between desired DOF state $x_{avdes}$ and positions $x_1$ and $x_2$ of the first and second actuators. In some examples, DOF control module 610 may include a transfer function for mapping positions $x_1$ and $x_2$ and desired DOF state $x_{avdes}$ to actuation command $F_{cmd}$ based on one or more dynamic and/or kinematic models of the first and/or second actuators, the one or more force or torque transmission mechanisms, the DOF, and/or other components of the instrument.

Actuation control module 620 receives positions $x_1$ and $x_2$, force command $F_{cmd}$, and target minimum tension c and generates actuation levels $F_1$ and $F_2$ for the first and second actuators respectively. In some examples, actuation control module 620 compensates for any disturbance force and/or torque applied to the DOF. In some examples, actuation control module 620 compensates for dynamics of the first and/or second actuators, the one or more force or torque transmission mechanisms, the DOF, and/or other components of the instrument. In some examples, the dynamics may include one or more of inertia and/or tension and/or compression in the first and/or second actuators, the one or more force transmission mechanisms, and/or other components of the instrument. In some examples, the disturbance force and/or torque applied to the DOF is accounted for using the actuation level $F_1$ or $F_2$ that is able to resist (e.g., pull against) the disturbance force and/or torque. In some examples, the dynamics of the first and/or second actuators, the one or more force or torque transmission mechanisms, the DOF, and/or other components of the instrument are accounted for using the actuation levels $F_1$ and $F_2$. In some examples, the actuation levels $F_1$ and $F_2$ accelerate the one or more force or torque transmission mechanisms, the DOF, and/or other components of the instrument. In some examples, because the disturbance force and/or torque is estimated, the exact break down between the actuation level $F_1$ or $F_2$ used to address the disturbance force and/or torque is estimated and the overall actuation levels $F_1$ and $F_2$ account for both the disturbance force and/or torque and the dynamics the one or more force or torque transmission mechanisms, the DOF, and/or other components of the instrument.

In some examples, actuation control module 620 is usable to control a DOF in an instrument where the one or more force or torque transmission mechanisms of the instrument are stored without tension (e.g., because the tension in the one or more force or torque transmission mechanisms is released when the instrument is not coupled to the actuation control module 620) because actuation control module 620 is able to dynamically adjust the tension in the one or more force or torque transmission mechanisms before use and in response to changing dynamics of the first and/or second actuators, the one or more force or torque transmission mechanisms, the DOF, and/or other components of the instrument.

Figure 7:
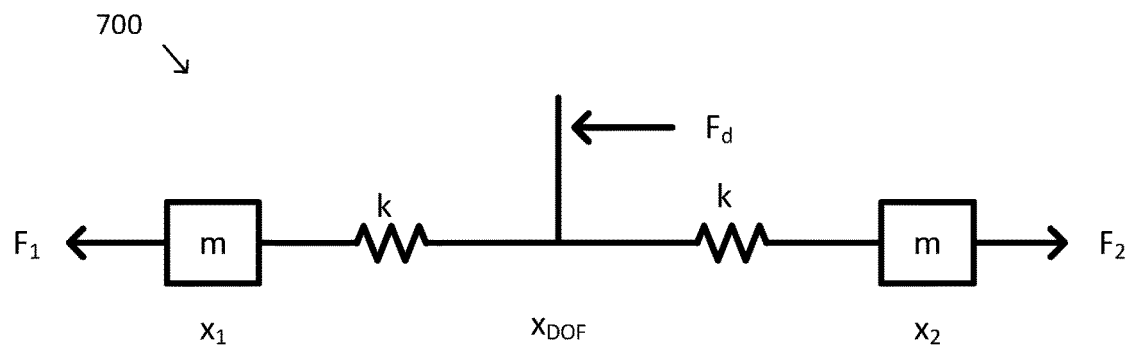
FIG. 7 is a simplified diagram of a free body diagram of a DOF of an instrument according to some embodiments.

According to some embodiments, derivation of the DOF control module 610 and/or actuation control module 620 depends on the instrument being controlled, the DOF of the instrument being controlled, and/or the extent to which the DOF may be operated in cooperation with at least one other DOF. As a non-limiting example, FIG. 7 shows a simplified diagram of a free body diagram 700 for a DOF of an instrument according to some embodiments. As shown in FIG. 7, the DOF is modeled as a linear DOF with a current position of $x_{DOF}$. The DOF is controlled in a first direction (e.g., to the left in FIG. 7) by a first linear actuator coupled to the DOF through a first force transmission mechanism. The first linear actuator has a mass of m, a position $x_1$, and is exerting an actuation force $F_1$ to pull and/or pay out the first force transmission mechanism. The first force transmission mechanism is modeled in a spring-like fashion with a spring constant of k. The DOF is controlled by a second direction (e.g., to the right in FIG. 7) by a second linear actuator coupled to the DOF through a second force transmission mechanism. The second linear actuator has a mass of m, a position $x_2$, and is exerting an actuation force $F_2$ to pull and/or pay out the second force transmission mechanism. The second force transmission mechanism is modeled in a spring-like fashion with a spring constant of k. Free body diagram 700 further shows that the DOF is subject to an externally applied disturbance force $F_d$. In some examples, mass m and/or spring constant k may be determined empirically. In some examples, mass m and/or spring constant k may be determined separately for each linear actuator and related component, such by using a calibration procedure.

Under the assumption that the lengths of the first and second force transmission mechanisms are the same and there is no stretch or compression in either of the first and second force transmission mechanisms, position $x_{DOF}$ corresponds to the midpoint between $x_1$ and $x_2$ such that $x_{DOF} = x_{av} = (x_1+x_2)/2$. In practice the lengths of the first and second force transmission mechanisms may not be the same. For example, there may be a difference between $x_A = x_2 - x_1$, the combined length of the first and second force transmission mechanisms and $x_{AR}$, the combined rest length (e.g., no tension or compression) of the first and second force transmission mechanisms.

In order to control the DOF of FIG. 7, it is desirable to decouple, to the extent possible, a force command $F_{cmd}$ that controls $x_{av}$, corresponding to the nominal desired DOF state (e.g., the nominal desired position) and $F_T$, a tensioning force that accounts for the tension in the first and second force transmission mechanism and helps reduce the likelihood of deformation of the first and second force transmission mechanisms and/or oscillations in the system. In some examples, $F_T$ is set to minimum tension $\varepsilon$. In some examples, $F_T$ may include an optional damping factor according to Equation 1, where $k_d$ is a damping constant and $x'_A$ is the first derivative of $x_A$. In some examples, $F_T$ may be maintained between a lower bound and an upper bound. In practice, however, this decoupling is not completely possible because force command $F_{cmd}$, in addition to moving the DOF to desired DOF position $x_{av}$, may have to overcome disturbance force $F_d$, but disturbance force $F_d$ may vary with changes in the state of the DOF and may also impact the tension and deformation in the first and second force transmission mechanisms.

$$F_T = \varepsilon - k_d \dot{x}_A \qquad \text{Equation 1}$$

Solving the system dynamics of free body diagram 700 results in Equations 2 and 3.

$$2m\ddot{x}_{av} = F_2 - F_1 - F_d \qquad \text{Equation 2}$$

$$m\ddot{x}_\Delta = F_2 + F_1 - k(x_\Delta - x_{\Delta R}) \qquad \text{Equation 3}$$

Letting $F_{cmd} = F_2 - F_1$ and providing tension control so that $F_2 + F_1 = 2F_T + F_d$ and solving for $F_1$ and $F_2$ results in Equations 4 and 5, respectively.

$$F_1 = F_T - \frac{F_{cmd}}{2} + \frac{F_d}{2} \qquad \text{Equation 4}$$

$$F_2 = F_T - \frac{F_{cmd}}{2} + \frac{F_d}{2} \qquad \text{Equation 5}$$

Thus, if $F_d$, $F_{cmd}$, and $F_T$ are known, actuation forces $F_1$ and $F_2$ to be applied by the first and second actuators, respectively may be determined to compensate for external disturbance force $F_d$, desired DOF state $x_{avdes}$, and the minimum tension $\varepsilon$ of the first and second force transmission mechanisms, while also accounting for any inertia in the first and/or second actuators and/or the first and second force transmission mechanism and/or any tension and/or compression in the first and/or second force transmission mechanisms. $F_{cmd}$ may be determined from the position control dynamics for the DOF (e.g., based on $x_1$, $x_2$, and desired DOF state $x_{avdes}$), $F_T$ is determined based on minimum tension c and the optional damping factor, but, in general, $F_d$ is external and is not generally knowable and/or directly measurable.

According to some embodiments, there are at least two options for estimating disturbance force $F_d$ to obtain an estimated disturbance force $\widehat{F_d}$. In some examples, estimated disturbance force $\widehat{F_d}$ may be determined based on the system dynamics according to Equation 6. In some examples, estimated disturbance force $\widehat{F_d}$ may alternatively be determined using a disturbance observer as shown in FIG. 8.

$$\widehat{F_d} = F_2 - F_1 - 2m\ddot{x}_{av} \qquad \text{Equation 6}$$

Figure 8:
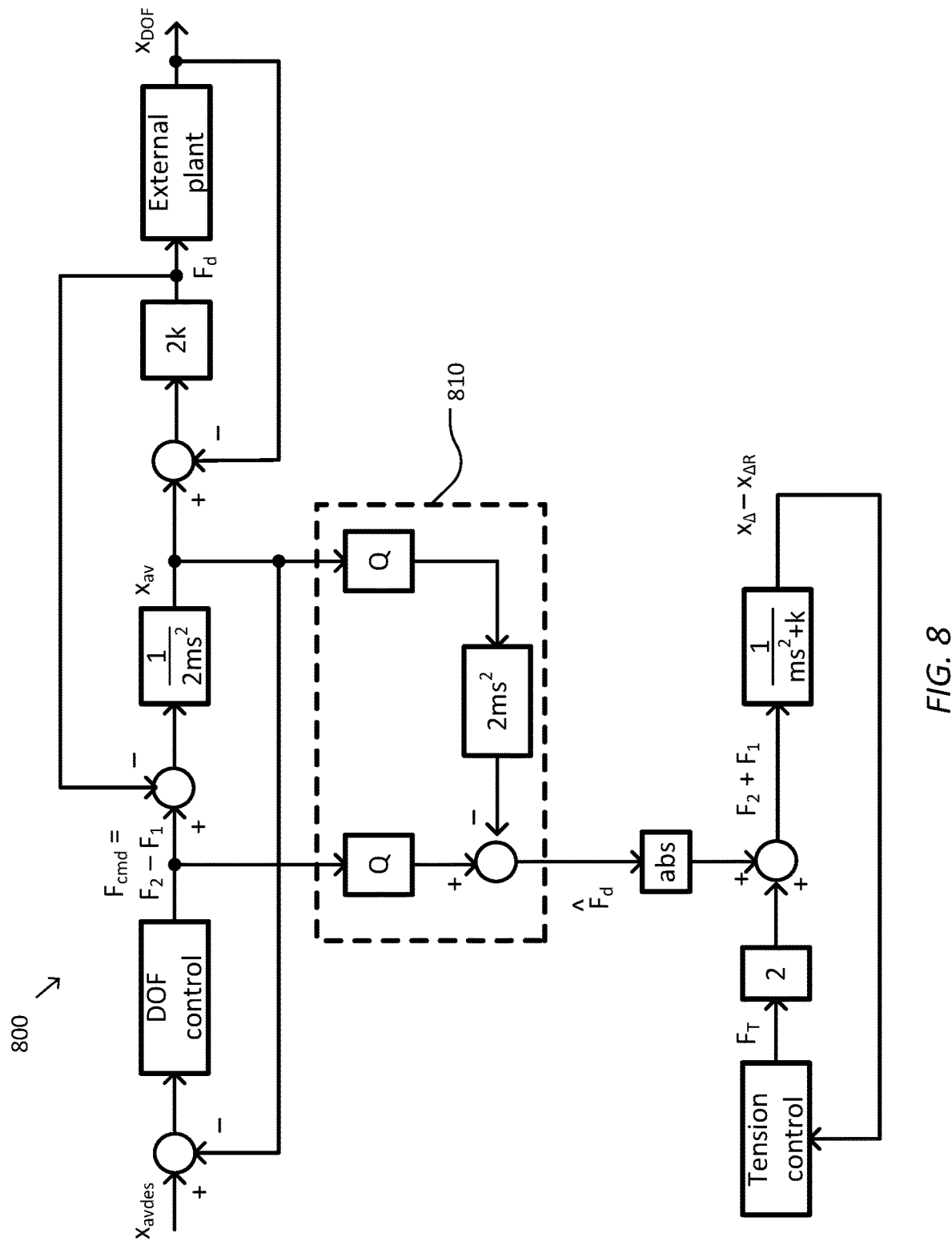
FIG. 8 is a simplified diagram of a control system for the DOF of the instrument of FIG. 7 according to some embodiments.

FIG. 8 is a simplified diagram of a control system 800 for the DOF of FIG. 7 according to some embodiments. In some embodiments, control system 800 is consistent with control system 600. As shown in FIG. 8, an error between desired DOF state $x_{avdes}$ and $x_{av}$ (e.g., a position error) is passed through a DOF control module (e.g., similar to DOF control module 610 where $x_{av}$ is inferred from $x_1$ and $x_2$) to generate force command $F_{cmd} = F_2 - F_1$. According to the dynamics of the instrument, a difference between force command $F_{cmd}$ and disturbance force $F_d$ as adjusted by the inertia dynamics ($1/(2 ms^2)$) control $x_{av}$. Further according to dynamics of the instrument, a difference between actual DOF state $x_{DOF}$ and $x_{av}$ as adjusted by the tension dynamics of the first and second force transmission mechanisms (2k) result in disturbance force $F_d$. Further, according to the dynamics of an external plant results in actual DOF position $x_{DOF}$.

A disturbance observer 810 is then used to determine estimated disturbance force $\widehat{F_d}$. Disturbance observer 810 uses a difference between force command $F_{cmd}$ and $x_{av}$ passed through an inverse dynamic model of the actuators (2 ms²) (to determine estimated disturbance force $\widehat{F_d}$. Disturbance observer 810 is also shown with optional low pass filters Q that limit the ability of high frequency disturbances to impact the determination of estimated disturbance force $\widehat{F_d}$. In some examples, low pass filters Q may also reduce high-frequency thrashing during control of the DOF.

A feedback loop may then be used to determine $F_2+F_1$ as the sum of the absolute value (abs) of estimated disturbance force $\widehat{F_d}$ and $2F_T$, where $F_T$ is determined from a difference between combined length $x_A$ and combined rest length $x_{AR}$ of the first and second force transmission mechanisms according to a tension control module. The tension control module accounts for desired target tension ε and optionally the damping term of Equation 1. The difference between combined length $x_A$ and combined rest length $x_{AR}$ of the first and second force transmission mechanisms is based on $F_2+F_1$ after accounting for the inertia and tension dynamics $(1/(ms^2+k))$.

Force command $F_{cmd}=F_2-F_1$ and $F_2+F_1$ determined from estimated disturbance force $\widehat{F_d}$ and $F_T$ may then be used to determine $F_1$ and $F_2$, the actuation levels of the first and second actuators respectively. Advantageously, this approach accounts for both the inertia in the first and second actuators and the first and second force transmission mechanisms as well as any tension and/or compression in the first or second force transmission mechanisms. Additionally, this approach also allows for tension in the first and/or second force transmission mechanisms to be controlled during use so that it is possible to release the tension in the first and second force transmission mechanisms when the instrument is not coupled to the medical device and store the instrument without the first and/or second force transmission mechanisms having to be kept under tension. In some examples, one of more of these advantages may reduce instrument cost as a wider range of materials may be used for the first and second force transmission mechanisms and/or increase instrument lifetime as tensions in the first and/or second force transmission mechanisms may be generally reduced overall.

And although the control system derivation of FIGS. 7 and 8 is greatly simplified, it is understood that the embodiments of FIGS. 7 and 8 could be adapted to other configurations and arrangements. In some embodiments, the kinematics chains used to control the two directions of the DOF need not be symmetric. In some examples, the mass of the first actuator may be different from the mass of the second actuator. In some examples, the spring constant of the first force transmission mechanism may be different from the spring constant of the second force transmission mechanism. In some examples, lengths of the first and second force transmission mechanisms may be different such that $x_{av}$ may be replaced with a different function of $x_1$ and $x_2$, which is consistent with the lengths of the first and second force transmission mechanisms. In some examples, the minimum tension for the first and second force transmission mechanisms may be different. In some embodiments, any of the positions ($x_1$, $x_2$, and/or $x_{DOF}$) may be linear and/or rotational positions and/or any combination thereof. In some embodiments, one or more of the forces ($F_1$, $F_2$, and/or $F_d$) may be a force or a torque and/or any combination thereof. In some embodiments, the masses and corresponding inertias may be modeled as linear and/or rotational masses and/or inertias. In some embodiments, the first and/or second force transmission mechanisms may alternatively be based on a non-linear model. In some embodiments, the first and/or second linear actuators may include a solenoid, an actuator driven lead screw, and/or the like. In some embodiments, the first and/or second linear actuators may be replaced with and/or include a rotational actuator, such as a motor, a servo, and/or the like. In some embodiments, the first and/or second force transmission mechanisms may include one or more cables, belts, bands, chains, pulleys, sprockets, gears, and/or the like.

And although FIGS. 7 and 8 show the dynamics and resulting control system for a linear version of finger 322 of instrument 300, in other embodiments, free body diagram 700 and control system 800 may be adapted to other instrument and DOF arrangements. In some examples, the linear positions $x_1$ and $x_2$ of FIG. 7 may be replaced with rotational positions for actuators 341 and/or 342. In some examples, external disturbance force $F_d$ may be replaced with an external disturbance torque. In some examples, actuation of actuators 341 and/or 342 may be modeled using force and/or torque depending on their configuration. In some examples, instrument 400 may be controlled using separate control systems for each of jaws 422 and 424 that are similar to control system 800. In some examples, the interaction that may occur between jaws 422 and 424 during gripping and ungripping may be accounted for using respective estimated disturbance forces or torques that include any external disturbance force or torque caused by jaws 422 and 424 pushing against each other and/or jaws 422 and 424 pushing against each other through a gripped material.

In some embodiments, free body diagram 700 and control system 800 may be similarly adapted for the three-DOF, four-actuator instrument 500 of FIGS. 5A and 5B despite the more complex arrangement between the DOFs and the impact of an external disturbance force or torque on any of the three DOFs also generating an external disturbance force or torque on the other DOFs. In some examples, the free body diagram for instrument 500 may include four disturbance observers, one for each of the actuator and corresponding force or torque transmission mechanisms 551-554. In some examples, the absolute value block applied to each of the estimated disturbance forces may be replaced to a block implementing Equation 7, where $C_{null}$ is the null-space row of the coupling matrix that converts actuator positions to joint positions and/or states, minel is the minimum element, $proj_{null\perp}(\widehat{F_d})$ projects the $\widehat{F_d}$ vector onto the null-perp space so that it removes the projection of the disturbance forces onto the torque null-space. In some examples, the dynamics of the system (e.g., 2 ms², 1/(2 ms²), and 1/(ms²+k)) are replaced with corresponding dynamic models of the three-DOF, four-actuator instrument system.

$$F_{null} \text{ such that minel}(proj_{null\perp}(\widehat{F_d})+C_{null}{}^TF_{null})=0 \quad \text{Equation 7}$$

Figure 9:
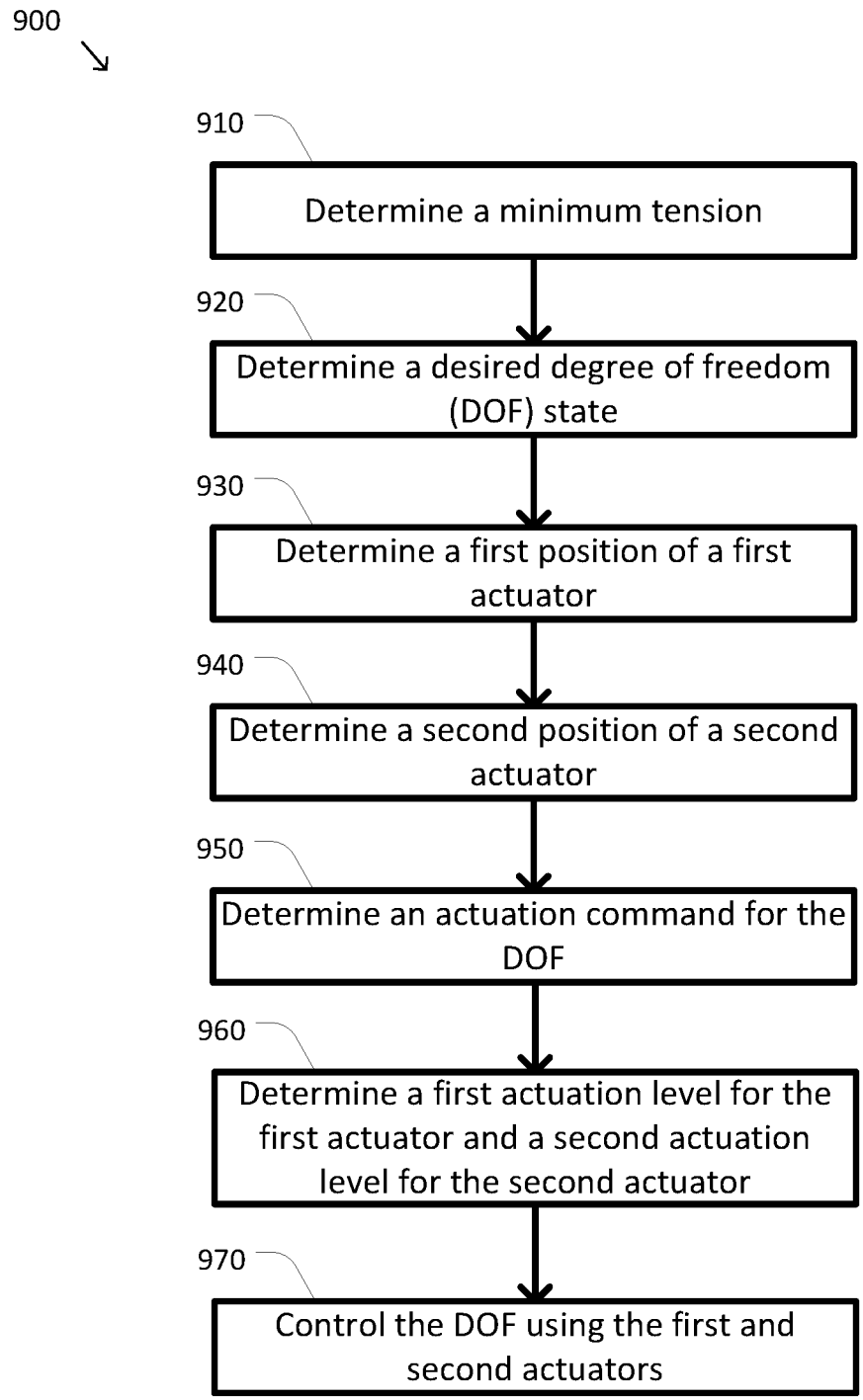
FIG. 9 is a simplified diagram of a method of controlling an instrument according to some embodiments.

FIG. 9 is a simplified diagram of a method 900 of controlling a DOF of an instrument according to some embodiments. One or more of the processes 910-970 of method 900 may be implemented, at least in part, in the form of executable code stored on non-transient, tangible, machine readable media that when run by one or more processors (e.g., the processor 150 in control unit 140) may cause the one or more processors to perform one or more of the processes 910-970. In some embodiments, method 900 may be performed by a module, such as control module 170. In some embodiments, method 900 may be used to operate the instrument so that control of a DOF accounts for inertia in the actuators, the force or torque transmission mechanisms, and/or other components of the instrument used to control the DOF and accounts for tension and/or compression in the force or torque transmission mechanisms. In some examples, method 900 may be used to perform a procedure using any of instruments 200, 300, 400, and/or 500. In some examples, method 900 may be implemented, at least in part, by a control system, such as control system 600 and/or control system 800.

At a process 910, a minimum tension is determined. In some examples, the minimum tension may correspond to minimum tension ε. In some examples, the minimum tension may correspond to a minimum tension to be maintained in one or more force or torque transmission mechanisms coupling a DOF to one or more corresponding actuators. In some examples, a different minimum tension may be determined for different force or torque transmission mechanisms. In some examples, the minimum tension may be set based on one or more of operator preference, instrument calibration, a type of instrument and/or DOF being controlled, a type procedure being performed, a type of material (such as tissue in a medical example) being manipulated using the DOF, and/or the like. In some examples, the minimum tension may be in the range of 3 to 8 Newtons.

At a process 920, a desired DOF state is determined. In some examples, the desired DOF state may correspond to desired DOF state $x_{avdes}$. In some examples, the desired DOF state corresponds to a desired linear position, a desired rotational position, a desired linear velocity, a desired rotational velocity and/or the like of the DOF. In some examples, the desired DOF state may be received from a control module, such as may be used to follow a desired motion plan, a desired trajectory, and/or the like. In some examples, desired DOF state $x_{avdes}$ may be determined based on input received from one or more input controls being manipulated by an operator.

At a process 930, a first position of a first actuator is determined. In some examples, the first position may be consistent with position $x_1$. In some examples, the first actuator may be consistent with actuator 341 and/or 342. In some examples, the first position may correspond to a rotational and/or a linear position of the first actuator. In some examples, the first position may correspond to a distance to which a first force or torque transmission mechanism is pulled and/or follows the first actuator. In some examples, the first position may be determined from one or more sensor readings, such as one or more position sensors, position encoders, and/or the like. In some examples, the first position may be determined using one or more kinematic models. In some examples, the first position may be determined from one or more images of the first actuators and/or the first force or torque transmission mechanism.

At a process 940, a second position of a second actuator is determined. In some examples, the second position may be consistent with position $x_2$. In some examples, the second actuator may be consistent with actuator 341 and/or 342. In some examples, process 940 may be substantially similar to process 930.

At a process 950, an actuation command for the DOF is determined. In some examples, the actuation command may be a force or torque command to drive the DOF to the desired DOF state determined during process 920. In some examples, the actuation command for the DOF may correspond to a difference between an actuation level applied by the second actuator and an actuation level applied by the first actuator. In some examples, the actuation command for the DOF may be consistent with $F_{cmd}$. In some examples, the command for the DOF may be determined using a DOF control module, such as DOF control module 610 and/or the DOF control module of FIG. 8. In some examples, the actuation command for the DOF may be determined based on one or more of the first position, the second position, the desired DOF state, and an actual DOF state. In some examples, the actual DOF state may be determined using one or more sensors, one or more images of the DOF, and/or the like. In some examples, the actual DOF state may be determined indirectly from the first position and the second position. In some examples, the actual DOF state may be determined based on dynamics of one or more of the first actuator, the second actuator, the first force or torque transmission mechanism and/or the second force or torque transmission mechanism.

At a process 960, a first actuation level for the first actuator and a second actuation level for the second actuator are determined. In some examples, the first actuation level may be a first actuation force or a first actuation torque and/or the second actuation level may be a second actuation force or a second actuation torque. In some examples, the first and second actuation levels may correspond to actuation forces $F_1$ and $F_2$, respectively. In some examples, the first and second actuation levels may be determined using an actuation control module, such as actuation control module 620 and/or control system 800. In some examples, first and second actuation levels may be determined based on dynamics of the instrument, the DOF, and/or the first and second actuators. In some examples, the dynamics include one or more of an inertia of the first actuator and/or the first force or torque transmission mechanism, an inertia of the second actuator and/or the second force or torque transmission mechanism, a tension and/or compression in the first force or torque transmission mechanism, and/or a tension and/or compression in the second force or torque transmission mechanism.

In some examples, the first and second actuation levels may be determined based on one or more of the actuation command of the DOF determined during process 950, the minimum tension determined during process 910, the first position determined during process 940, and/or the second position determined during process 950. In some examples, the first and second actuation levels may be determined from the actuation command, an estimate of an external disturbance force or torque applied to the DOF, and a tensioning force or torque. In some examples, the tensioning force or torque may be consistent with tensioning force $F_T$. In some examples, the tensioning force or torque may be based on the minimum tension determined during process 910. In some examples, the tensioning force or torque. may include a dampening term. In some examples, the tensioning force or torque. may be determined using Equation 1. In some examples, the tensioning force or torque may be maintained between a lower bound and an upper bound. In some examples, the estimate of the external disturbance force or torque may be consistent with estimated disturbance force $\widehat{F_d}$. In some examples, the estimate of the external disturbance force or torque may be determined based on dynamics of the instrument, the DOF, and/or the first and second actuators, such as by using Equation 6. In some examples, the estimate of the external disturbance force or torque may be determined using a disturbance observer, such as disturbance observer 810. In some examples, the disturbance observer may include one or more low pass filters to remove high-frequency components from the estimate of the external disturbance force or torque.

At a process 970, the DOF is controlled using the first and second actuators. The first actuation level is used to determine a force or torque applied by the first actuator and the second actuation level is used to determine a force or torque applied by the second actuator. In some examples, first and second actuation levels may be provided as set points to respective controllers configured to control the first and second actuators, respectively.

In some embodiments, method 900 may be repeated multiple times by returning to process 910 when a different minimum tension is desired, to process 920 when a change in the desired DOF state occurs, and/or the process 930 as part of a next control cycle. In some examples, method 900 may be repeated with each control cycle of the instrument and/or the DOF.

Advantageously, method 900 accounts for both the inertia in the first and second actuators and the first and second force or torque transmission mechanisms as well as any tension and/or compression in the first or second force or torque transmission mechanisms. Additionally, method 900 also allows for tension in the first and/or second force or torque transmission mechanisms to be controlled during use so that it is possible to store the instrument without the first and/or second force or torque transmission mechanisms having to be kept under tension (e.g., releasing tension in the first and/or second force or torque transmission mechanisms after use). In some examples, one of more of these advantages may reduce instrument cost as a wider range of materials may be used for the first and second force or torque transmission mechanisms and/or increase instrument lifetime as tensions in the first and/or second force or torque transmission mechanisms may be generally reduced overall.

Some examples of control units, such as control unit 140 may include non-transitory, tangible, machine-readable media that include machine-readable instructions that when run by one or more processors (e.g., processor 150) may cause the one or more processors to perform the processes of method 900 and/or the computations of control systems 600 and/or 800. Some common forms of machine readable media that may include the processes of method 900 and/or the computations of control systems 600 and/or 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-assisted device comprising:
a first actuator configured to actuate a degree of freedom of an instrument in a first direction using a first force or torque transmission mechanism;
a second actuator configured to actuate the degree of freedom in a second direction using a second force or torque transmission mechanism, the second direction being at least partially opposite to the first direction; and
a control unit coupled to the first actuator and the second actuator;
wherein the control unit is configured to:
determine a first position of the first actuator;
determine a second position of the second actuator;
determine a force or torque command based on the first position, the second position, and a desired state of the degree of freedom;
determine a first actuation level of the first actuator and a second actuation level of the second actuator so as to maintain a first tension in the first force or torque transmission mechanism above a first minimum tension and maintain a second tension in the second force or torque transmission mechanism above a second minimum tension by:
using a model based on the force or torque command, the first and second minimum tensions, the first position, and the second position; and
command actuation of the first actuator at the first actuation level and actuation of the second actuator at the second actuation level;
wherein the model compensates for an external disturbance on the degree of freedom and for dynamics of the first actuator and the second actuator.

2. The computer-assisted device of claim 1, wherein the desired state of the degree of freedom is a linear position, a rotational position, or a velocity.

3. The computer-assisted device of claim 1, wherein the model compensates for the dynamics of the first actuator by modeling an inertia of the first actuator.

4. The computer-assisted device of claim 1, wherein the model further compensates for dynamics of the first force or torque transmission mechanism by modeling at least one parameter selected from the group consisting of: an inertia of the first force or torque transmission mechanism, and a tension or compression in the first force or torque transmission mechanism.

5. The computer-assisted device of claim 1, wherein the force or torque command is a difference between the second actuation level and the first actuation level.

6. The computer-assisted device of claim 1, wherein the control unit is further configured to estimate the external disturbance on the degree of freedom based on the dynamics.

7. The computer-assisted device of claim 1, wherein the control unit is further configured to estimate the external disturbance on the degree of freedom using a disturbance observer.

8. The computer-assisted device of claim 7, wherein the disturbance observer includes one or more low pass filters to remove high frequency components from the estimated external disturbance.

9. The computer-assisted device of claim 1, wherein the control unit is further configured to:
determine at least one of the first or second minimum tensions based on one or more of calibration of the instrument, a type of the instrument, or a type of a procedure being performed; or
pretension the first and second force or torque transmission mechanisms based on the first and second minimum tensions before using the instrument.

10. The computer-assisted device of claim 1, wherein tension in the first and second force or torque transmission mechanisms is released when the instrument is not coupled to the computer-assisted device.

11. The computer-assisted device of claim 1, wherein the model further adjusts the first tension or the second tension based on a damping factor.

12. The computer-assisted device of claim 1, wherein the control unit is further configured to maintain the first and second tensions between a lower bound and an upper bound.

13. A method comprising:
   determining, by a control unit of a computer-assisted device, a first position of a first actuator configured to actuate a degree of freedom of an instrument in a first direction using a first force or torque transmission mechanism;
   determining, by the control unit, a second position of a second actuator configured to actuate the degree of freedom in a second direction using a second force or torque transmission mechanism, the second direction being at least partially opposite to the first direction;
   determining, by the control unit, a force or torque command based on the first position, the second position, and a desired state of the degree of freedom;
   determining, by the control unit, a first actuation level of the first actuator and a second actuation level of the second actuator so as to maintain a first tension in the first force or torque transmission mechanism above a first minimum tension and maintain a second tension in the second force or torque transmission mechanism above a second minimum tension by: using a model based on the force or torque command, the first and second minimum tensions, the first position, and the second position; and
   commanding, by the control unit, actuation of the first actuator at the first actuation level and actuation of the second actuator at the second actuation level;
   wherein the model compensates for an external disturbance on the degree of freedom and for dynamics of the first actuator and the second actuator.

14. The method of claim 13, further comprising: using the model to compensate for the dynamics of the first actuator by modeling an inertia of the first actuator.

15. The method of claim 13, further comprising: using the model to compensate for dynamics of the first force or torque transmission mechanism by modeling at least one parameter selected from the group consisting of: an inertia of the first force or torque transmission mechanism, and a tension or compression in the first force or torque transmission mechanism.

16. The method of claim 13, further comprising: estimating the external disturbance on the degree of freedom based on the dynamics or by using a disturbance observer.

17. The method of claim 13, further comprising:
   determining at least one of the first or second minimum tensions based on one or more of calibration of the instrument, a type of the instrument, or a type of a procedure being performed; or
   pre-tensioning the first and second force or torque transmission mechanisms based on the first and second minimum tensions before using the instrument.

18. The method of claim 13, further comprising:
   adjusting the first tension or the second tension based on a damping factor; or maintaining the first and second tensions between a lower bound and an upper bound.

19. A non-transitory machine-readable medium comprising a plurality of machine-readable instructions which when executed by one or more processors associated with a computer-assisted medical device are adapted to cause the one or more processors to perform a method comprising:
   determining a first position of a first actuator configured to actuate a degree of freedom of an instrument in a first direction using a first force or torque transmission mechanism;
   determining a second position of a second actuator configured to actuate the degree of freedom in a second direction using a second force or torque transmission mechanism, the second direction being at least partially opposite to the first direction;
   determining a force or torque command based on the first position, the second position, and a desired state of the degree of freedom;
   determining a first actuation level of the first actuator and a second actuation level of the second actuator so as to maintain a first tension in the first force or torque transmission mechanism above a first minimum tension and maintain a second tension in the second force or torque transmission mechanism above a second minimum tension by: using a model based on the force or torque command, the first and second minimum tensions, the first position, and the second position; and
   commanding actuation of the first actuator at the first actuation level and actuation of the second actuator at the second actuation level;
   wherein the model compensates for an external disturbance on the degree of freedom and for dynamics of the first actuator and the second actuator.

20. The non-transitory machine-readable medium of claim 19, wherein the method further comprises:
   using the model to compensate for the dynamics of the first actuator by modeling an inertia of the first actuator, an inertia of the first force or torque transmission mechanism, or a tension or compression in the first force or torque transmission mechanism.

21. The non-transitory machine-readable medium of claim 19, wherein the method further comprises:
   estimating the external disturbance on the degree of freedom based on the dynamics; or
   estimating the external disturbance on the degree of freedom using a disturbance observer.

* * * * *